United States Patent
Saccoccio et al.

(10) Patent No.: US 9,431,725 B2
(45) Date of Patent: Aug. 30, 2016

(54) WATER BONDING FIXTURE

(71) Applicant: Asia Connection LLC, New York, NY (US)

(72) Inventors: Mitch Saccoccio, Clarksville, VA (US); Jonathan Bonelli, New York, NY (US); Reza Afshar, Westlake Village, CA (US)

(73) Assignee: ASIA CONNECTION LLC, New York, NY (US)

( * ) Notice: Subject to any disclaimer, the term of this patent is extended or adjusted under 35 U.S.C. 154(b) by 0 days.

(21) Appl. No.: 14/566,110

(22) Filed: Dec. 10, 2014

(65) Prior Publication Data

US 2015/0167335 A1    Jun. 18, 2015

Related U.S. Application Data (60) Provisional application No. 61/915,611, filed on Dec. 13, 2013.

(51) Int. Cl.
  *H01R 4/66* (2006.01)
  *E04H 4/14* (2006.01)

(52) U.S. Cl.
  CPC .. *H01R 4/66* (2013.01); *E04H 4/14* (2013.01)

(58) Field of Classification Search
  CPC .......... H01R 13/65802; H01R 13/658; H01R 23/6873; H01R 4/64; H01R 4/66; H01R 13/648; H01R 13/652; H01R 4/646; H01R 2103/00

USPC ..................................................... 439/92, 97
See application file for complete search history.

(56) References Cited

U.S. PATENT DOCUMENTS

| | | | | | |
|---|---|---|---|---|---|
| 3,256,573 | A | * | 6/1966 | Hunter ................ | B22C 5/0427 241/110 |
| 3,447,233 | A | * | 6/1969 | Sherwin ................ | B23K 20/00 136/205 |
| 3,742,985 | A | * | 7/1973 | Rubenstein ........... | B28B 23/046 138/141 |
| 3,847,722 | A | * | 11/1974 | Kistner ............... | B29C 67/0037 138/97 |
| 3,847,810 | A | * | 11/1974 | Tulumello ......... | B01D 17/0202 210/391 |
| 3,967,872 | A | * | 7/1976 | Mooney .................... | H01R 4/64 174/78 |
| 4,106,832 | A | * | 8/1978 | Burns ...................... | H01R 4/64 439/100 |
| 4,369,266 | A | * | 1/1983 | Kuhls .................... | B01D 61/58 523/310 |

(Continued)

FOREIGN PATENT DOCUMENTS

JP            11089053 A    *    3/1999

*Primary Examiner* — Abdullah Riyami
*Assistant Examiner* — Vladimir Imas
(74) *Attorney, Agent, or Firm* — Dilworth & Barrese, LLP.

(57) ABSTRACT

A water bonding fixture is provided herein which includes a shaft and a plurality of electrically conductive arcuate shaped plates disposed at one end of the shaft and spaced apart from each other so as to provide a gap between adjacent plates. The water bonding fixture is preferably used in conjunction with swimming pool equipment such as pool pumps, skimmers and filters.

10 Claims, 6 Drawing Sheets

(56) References Cited

U.S. PATENT DOCUMENTS

| | | | |
|---|---|---|---|
| 4,541,413 A | 9/1985 | Cannaux et al. | |
| 4,660,909 A * | 4/1987 | Wilson | G01R 19/155 174/5 SG |
| 5,127,907 A * | 7/1992 | Coutre | A61M 5/14224 361/212 |
| 5,166,626 A * | 11/1992 | Hester | G01B 7/14 324/683 |
| 5,270,004 A * | 12/1993 | Cosentino | A61M 1/1698 128/DIG. 3 |
| 5,364,281 A | 11/1994 | Leto | |
| 5,440,235 A | 8/1995 | Oko | |
| 5,460,532 A | 10/1995 | Leto | |
| 5,531,883 A | 7/1996 | Cameron et al. | |
| 5,541,363 A | 7/1996 | Weise et al. | |
| 5,545,952 A | 8/1996 | Mortensen | |
| 5,730,149 A * | 3/1998 | Nakayama | A61B 10/007 600/573 |
| 6,040,522 A * | 3/2000 | Beggs | H01R 4/66 174/5 SG |
| 6,497,841 B1 * | 12/2002 | Plotkin | F28F 21/062 422/44 |
| 6,498,291 B2 * | 12/2002 | Brammer | H01R 4/66 174/3 |
| 6,501,385 B1 * | 12/2002 | O'Quinn | H01R 4/66 340/649 |
| 6,530,757 B1 | 3/2003 | Soyer et al. | |
| 6,684,588 B1 | 2/2004 | Jones | |
| 6,725,524 B2 | 4/2004 | Lin et al. | |
| 6,766,573 B2 | 7/2004 | Long et al. | |
| 7,097,255 B2 * | 8/2006 | Drake | E21C 41/24 299/56 |
| 7,168,416 B2 | 1/2007 | Powell et al. | |
| 7,485,014 B2 * | 2/2009 | De France | H01R 4/5091 439/803 |
| 7,670,153 B2 * | 3/2010 | Kulig | H01R 4/26 439/432 |
| 7,727,387 B2 | 6/2010 | Goggin | |
| 7,828,530 B2 | 11/2010 | Queirel | |
| 7,854,629 B1 | 12/2010 | Albers et al. | |
| 7,927,113 B2 | 4/2011 | Chaumet et al. | |
| 7,931,447 B2 | 4/2011 | Levin et al. | |
| 8,152,538 B1 * | 4/2012 | Papageorge | E04H 4/1209 204/665 |
| 8,188,477 B2 * | 5/2012 | Miyairi | H01L 27/1225 257/258 |
| 8,708,723 B2 * | 4/2014 | Stoltz | B01F 7/001 29/845 |
| 8,747,126 B2 * | 6/2014 | Corbett | H01R 4/66 439/98 |
| 8,748,748 B2 * | 6/2014 | Shapiro | H01R 4/66 174/135 |
| 8,899,998 B2 * | 12/2014 | Pyron | H01R 4/30 439/100 |
| 8,906,300 B2 * | 12/2014 | Wang | 422/44 |
| 2011/0003331 A1 * | 1/2011 | Pavia | C12M 35/02 435/41 |
| 2011/0094025 A1 * | 4/2011 | West | E04H 4/0012 4/506 |
| 2014/0163664 A1 * | 6/2014 | Goldsmith | A61B 17/00491 623/1.11 |

* cited by examiner

WATER BONDING FIXTURE

REFERENCE TO PRIOR APPLICATION

This application claims the benefit of U.S. Provisional Application No. 61/915,011, filed Dec. 13, 2013, the entire contents of which are incorporated herein by reference.

BACKGROUND

The present invention is related to the bonding of a fluid to equalize electrical potentials.

Water in swimming pools, hot tubs and spas can develop differences in electrical potential in various locations which can result in an electrical shock to bathers. To prevent the development of different electrical potentials the metal parts of the electrical equipment connected with the water circulation system must be brought to the same electrical potential as the water by means of electrical conductors. This is accomplished by "water bonding".

In accordance with current regulations, the water in the swimming pool must be in contact with a corrosion resistant conductor of at least 9 square inches of surface area. What is needed is a conductive fitting which satisfies the legal requirements for water bonding and can be incorporated into water pumping systems and/or retrofitted to existing swimming pool systems such as skimmers and the like.

SUMMARY

A water bonding fixture is provided herein which can include a shaft; and a plurality of electrically conductive arcuate shaped plates disposed at one end of the shaft end spaced apart from each other so as to provide a gap between adjacent plates. The water bonding fixture is preferably used in conjunction with swimming pool equipment such as pool pumps, skimmers and filters.

BRIEF DESCRIPTION OF THE DRAWINGS

Various embodiments are described below with reference to the drawings wherein.

Like reference numerals indicate similar parts throughout the figures.

DETAILED DESCRIPTION OF PREFERRED EMBODIMENT(S)

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Reference will now be made in detail to the exemplary embodiments of the present disclosure, which are illustrated the accompanying figures.

The water bonding fixture of the invention is preferably used in conjunction with pool equipment such as pumps, filters and skimmers and serves to electrically ground the water to prevent unequal electrical potentials between the water and any metallic objects in the pool environment. As used herein, the term "pool" encompasses swimming pools, hot tubs, spas and other bathing facilities. Although described herein with respect to pools, the water bonding fixture can be used in connection with other water environments that require water bonding, for example, fish tanks, water gardens, and fountains.

Figure 1:
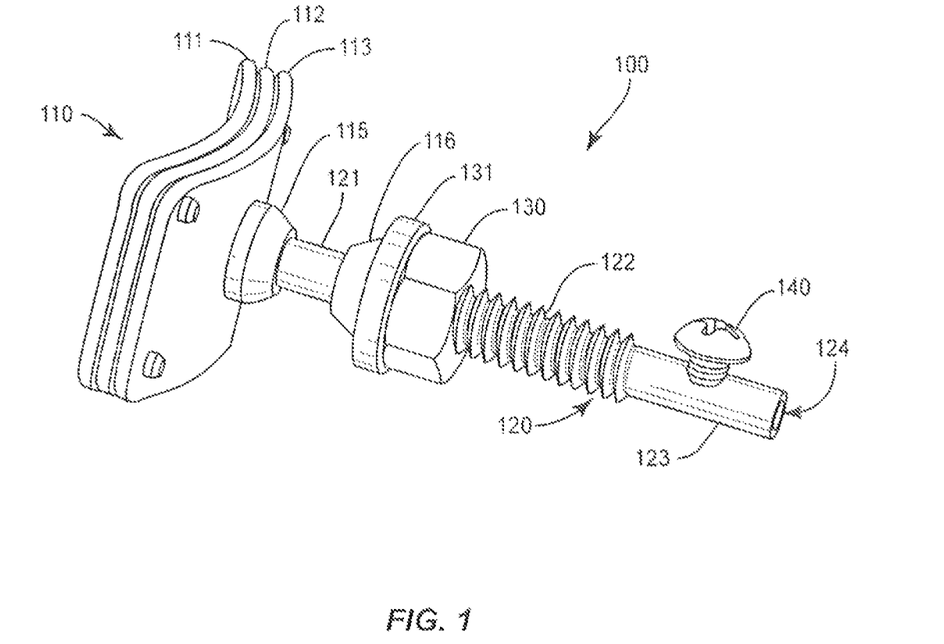
FIG. 1 is a perspective view of an embodiment of the water bonding fixture of the invention.

Referring to FIG. 1, in an embodiment the bonding fixture 100 includes a shaft 120 and a plurality of electrically conductive plates 111/112/113 in a head portion 110 attached to one end of said shaft 120. Head portion 110 includes at least two, and preferably three or more plates.

In the embodiment illustrated herein, head portion 110 includes three arcuate plates 111/112/113 having a substantially quadrangular periphery. Plates 111/112/113 are substantially parallel to each other, or layered, arranged and spaced apart from each other to provide a gap between adjacent plates. The gap between the adjacent plates is wide enough to permit the flow of water therethrough and preferably ranges from about 0.015 inches to about 0.25 inches, although distances outside of this range may also be employed whenever appropriate for the purposes described herein.

Figure 2A:
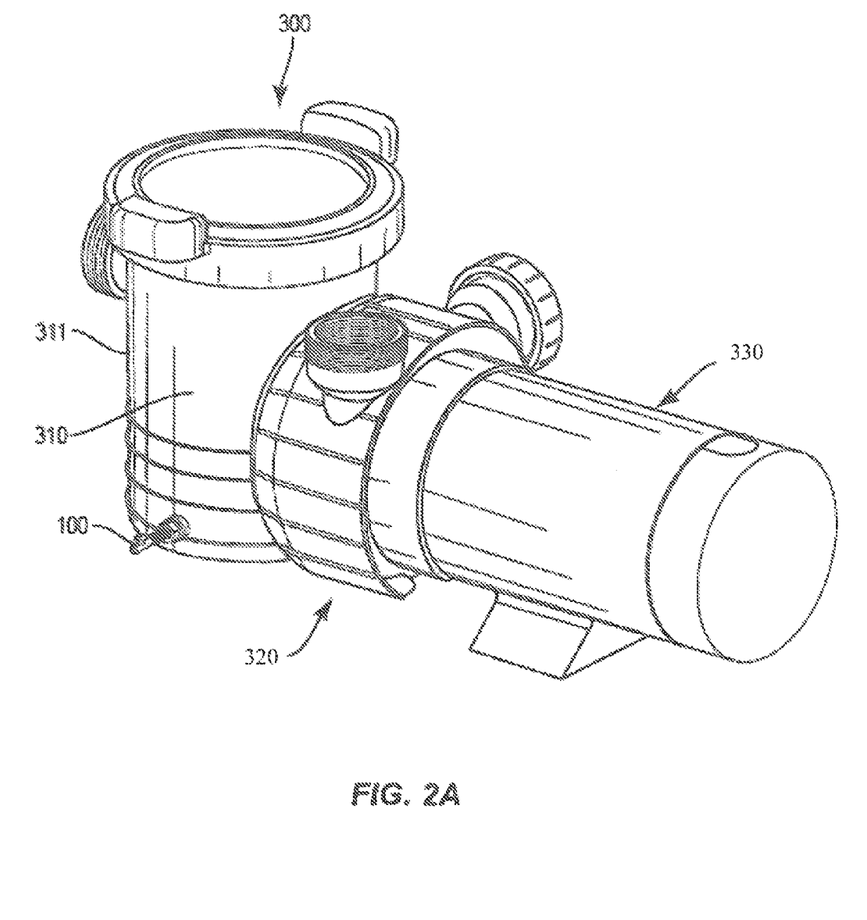
FIG. 2A illustrates a swimming pool pump assembly including the water bonding fixture according to the present disclosure.
Figure 2B:
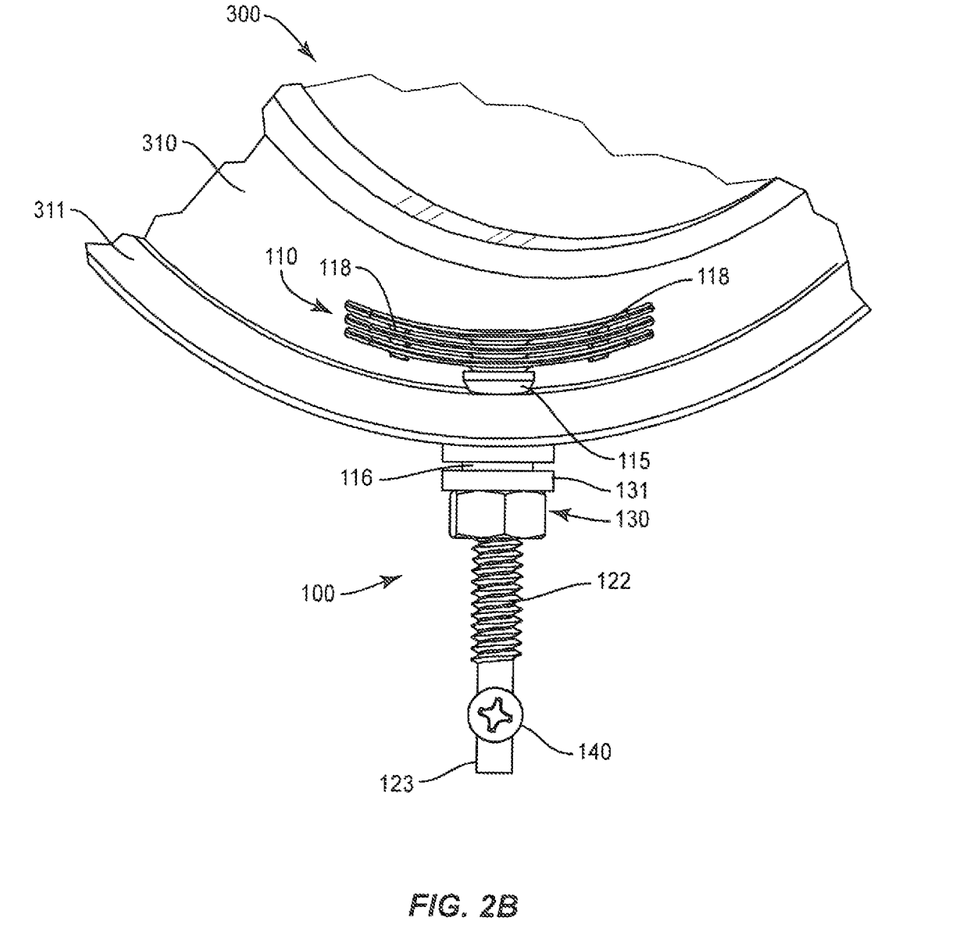
FIG. 2B illustrates the water bonding fixture of the invention in connection with the reservoir of a pump.

Plates 111/112/113 can be fabricated from an electrically conductive material such as stainless steel, aluminum, brass copper and the like, which is sufficiently corrosion resistant to maintain water bonding effectiveness over the life of the fixture. Spacer elements 118 (FIG. 2) can be disposed between plates 111/112/113 to maintain the gap spacing.

According to some existing building codes, a plate surface area in contact with the water is required to be a minimum of nine square inches. A single plate with a surface area of nine square inches can be difficult to deploy in small, confined and/or shaped locations. For example, a reservoir or pump may have limited interior space in which a large plate could obstruct water flow therein. With multiple plates the overall dimensions can be reduced. For example, with three plates each plate can be reduced in size to possess a surface area of three square inches, thereby permitting use of the bonding fixture of the present application in more confined locations.

Shaft 120 of bonding fixture 100 is generally cylindrical and can include a smooth portion 121 in the vicinity of head portion 110, a threaded portion 122, and an end portion 123.

A nut 130 (e.g., a hex nut) may be mounted on threaded portion 122 and a washer 131 can be mounted on the shaft 120 between the nut 130 and head portion 110. Seals 115 and 116 can be mounted on the shaft smooth portion 121 between head portion 110 and washer 131. Seals 115 and 116 are preferably fabricated from a resilient polymeric material.

End portion 123 of the shaft preferably has an axial bore 124 and a screw fastener 140 rotatably mounted to the side of the shaft and which penetrates the shaft. Axial bore 124 is adapted to receive a conductive grounding wire which is inserted therein to a distance aligned with screw 140. Screw 140 can be tightened to press down on the wire in bore 124, thereby fixedly securing the wire and preventing its unintended detachment from bonding fixture 100. Other means for connecting a grounding wire to water bonding fixture 100 are contemplated.

Figure 1A:
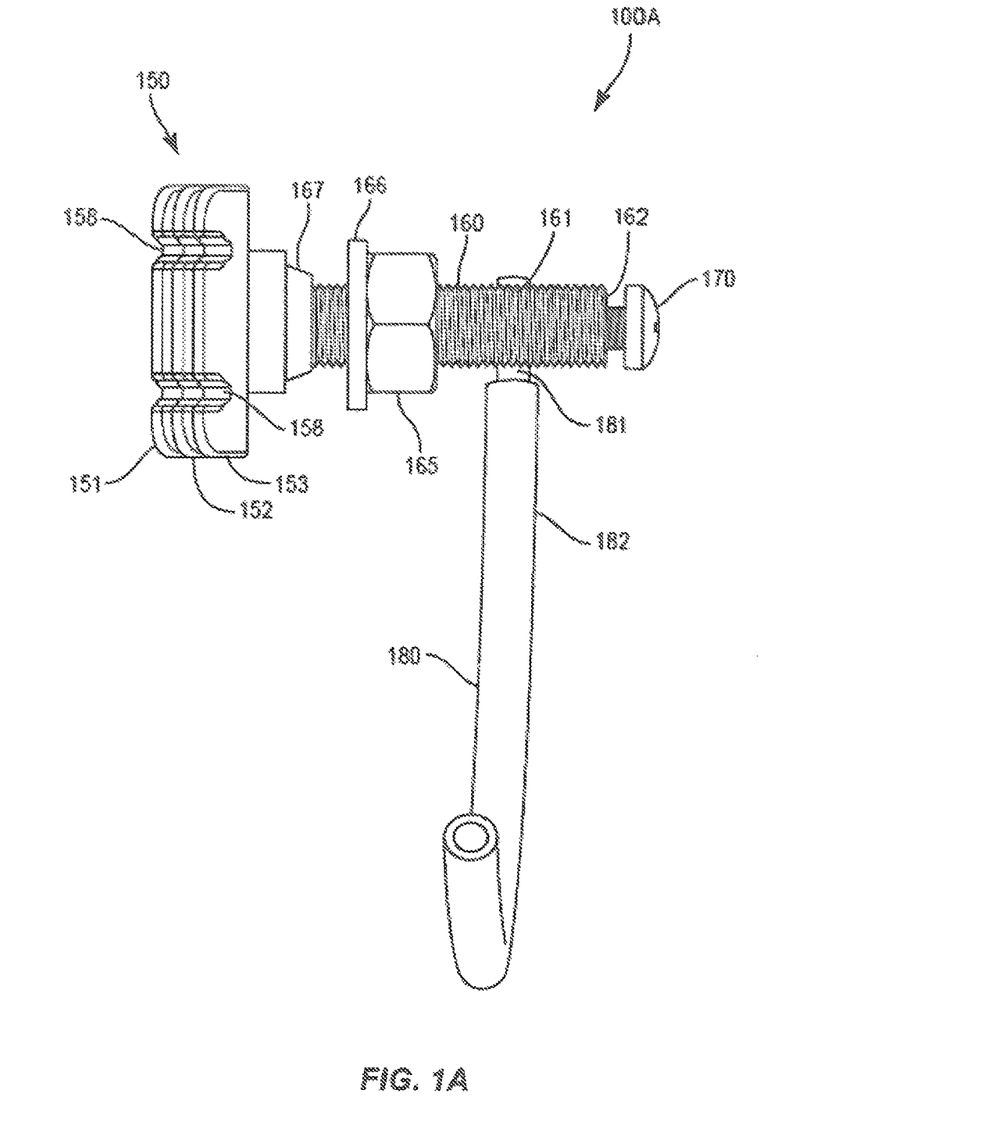
FIG. 1A is an alternative embodiment of the water bonding fixture of the Invention.

Referring now to FIG. 1A, an alternative embodiment 100A of the water bonding fixture 100A having multiple arcuate quadrangular plates is illustrated. Water bonding fixture 100A includes a head portion 150 having multiple conductive plates 141/152/153 mounted to a threaded shaft 160. Shaft 160 includes a transverse aperture 161 and an axial aperture 162. Water bonding fixture 100A further includes a nut 165 rotatably mounted on threaded shaft 160, a washer 166 and a resilient seal 167. A grounding cable 180 having a conductive wire 181 and insulative sheath 182 is shown connected to shaft 160 such that the wire 181 is disposed through the transverse aperture 161. A screw member 170 is engaged in axial aperture 162 and may be tightened onto the wire 181 to fixedly secure wire 181 to prevent inadvertent disconnection.

Although several configurations have been described herein to connect a grounding wire to the water bonding fixture (e.g., 124/140 or 161/170), other configurations are contemplated. For example, the grounding wire can be soldered or welded directly to the shaft without any apertures or screws.

Referring now to FIGS. 2A and 2B, the bonding fixture 100 is shown in conjunction with a reservoir 300 of a swimming pool pump assembly 350. Swimming pool pump assembly 350 includes a strainer assembly 300, a centrifugal pump assembly 320 and a motor 330. Strainer assembly 300 includes a strainer housing or chamber 310. Chamber 310 is enclosed by wall 311 and during use contains water which is in fluid connection with the swimming pool water. Bonding fixture 100 is disposed through an aperture in the wall 311 such that head portion 110 containing plates 111/112/113 is positioned in chamber 310 and in contact with the water. Seal 115 abuts the inner opening of the aperture to prevent water leakage therethrough. Seal 116 closes the outer opening of the aperture in wall 311. Seals 115 and 116 have conical portions to seat securely in the respective openings of the aperture in the wall 311; other seal configurations are contemplated.

In use, the nut 130 is rotated along threaded portion 122 to force the washer 116 into tight engagement with the aperture, thereby sealing the aperture to prevent leakage of water therethrough. The grounding wire is inserted into bore 124 in the exposed end of shaft 120 and screw 140 is the tightened to secure the grounding wire. Bonding fixture 100A may be employed in a of pump in a manner similar to that of fixture 100.

Figure 3:
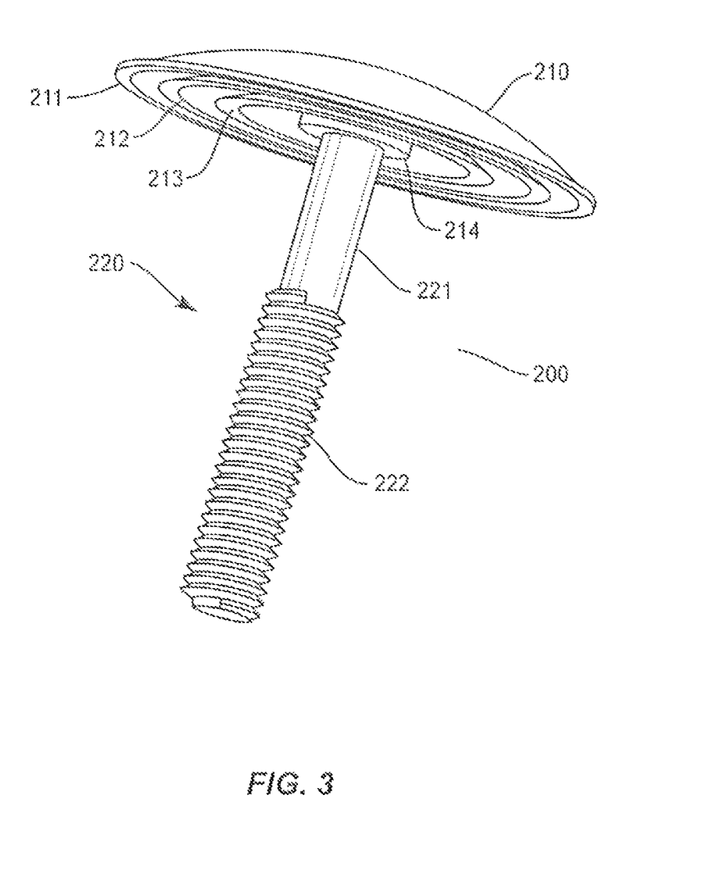
FIG. 3 is perspective an alternative embodiment of the water bonding fixture; and, FIG. 4 is a sectional view of the embodiment of FIG. 3.
Figure 4:
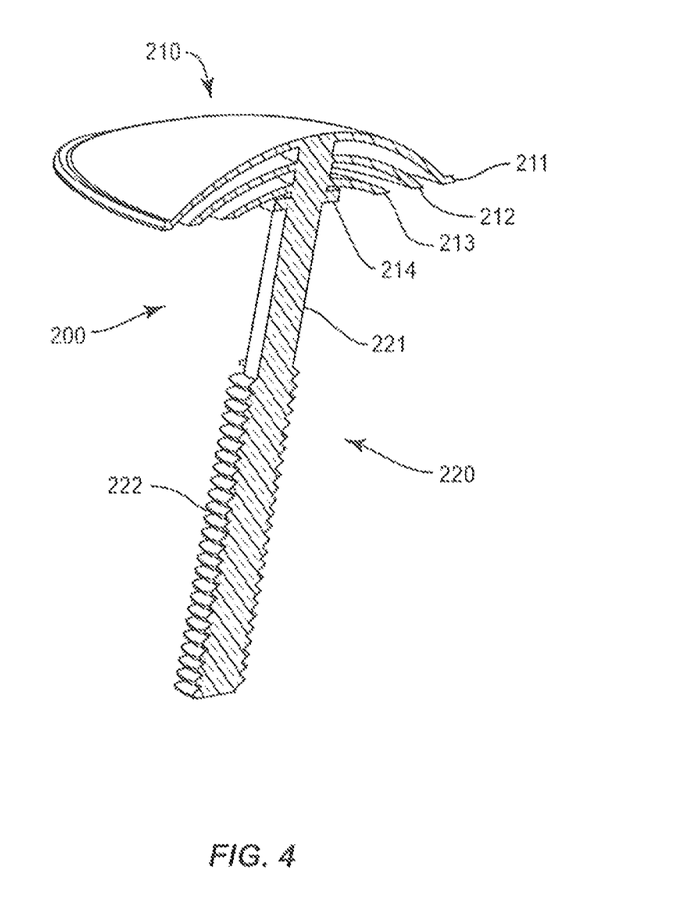

Referring now to FIGS. 3 and 4, in another embodiment bonding fixture 200 includes a shaft 220 with a smooth portion 221 and a threaded portion 229. At the end of smooth portion 221, bonding fixture 200 includes a head portion 210. Head portion 210 includes a plurality of convex electrically conductive plates 211/212/213 each having a circular periphery. Plates 211/212/213 are arranged concentrically in spaced configuration so as to provide gaps between the adjacent plates. The gaps are of sufficient dimensions so as to permit the flow of water therethrough. A disk shaped flange 214 is disposed on smooth portion 221 in the concavity formed by the plate 213. As with the previously described embodiment discussed above, the total surface area of the plates 211/212/213 must be at least nine square inches to comply with building code requirements (although variations are contemplated). A single plate would require a diameter of about 3.4 inches. However, the overall diameter of the largest plate 211 can be reduced since multiple plates are employed, each of which contributes to conductive surface a ea for water bonding.

Bonding fixture 200 can be integrally fabricated as a single piece of metal and can be used in conjunction with washer(s), seal(s) and nut(s) as described above to be mounted to a pool pump, skimmer, filter or other pool equipment. Any of known means (not shown) for attaching a grounding wire to bonding fixture 200 can be used in connection with bonding fixture 200.

Bonding fixtures 100, 100A and 200 can be used in original equipment or can be after market items for retrofitting into existing equipment.

While the above description contains many specifics, these specifics should not be construed as limitations of the invention, but merely as exemplifications of preferred embodiments thereof. Those skilled in the art will envision many other embodiments within the scope and spirit of invention as defined by the claims appended hereto. For example, although the water bonding fixtures described herein are shown in conjunction with a pool pump, they can be used in any pool equipment wherein the bonding fixture is in contact with water in fluid connection with water in a bathing facility.

What is claimed is:

1. A system for electrically grounding water in a pool environment, comprising:
    a water bonding fixture including a shaft, and a plurality of conductive arcuate shaped plates disposed at one end of the shaft and spaced apart from each other so as to provide a gap between adjacent plates; and
    pool equipment having a space through which water is moved in fluid communication with water in the pool environment, the plates of the water bonding fixture disposed in said space and contactable with the water moved therethrough.

2. The system of claim 1 wherein the plates have a quadrangular periphery.

3. The system of claim 1 wherein the plates have a circular periphery.

4. The system of claim 1 wherein the shaft has a threaded portion.

5. The system of claim 4 further including a nut mounted to the threaded portion of the shaft.

6. The system of claim 1 wherein said water bonding fixture is configured to connect to a grounding wire.

7. The system of claim 1, further comprising at least one seal positionable on the shaft and configured to provide a water seal between the shaft and the seal.

8. The system of claim 1, wherein the arcuate shape of the plurality of electrically conductive plates is configured to substantially match an arcuate shape of the pool equipment.

9. The system of claim 1, further comprising electrical grounding conductor connection configured to connect an electrical grounding conductor to the shaft of the water bonding fixture.

10. The system of claim 1 wherein the pool equipment is a pump, filter or skimmer.

\* \* \* \* \*